(12) United States Patent
Leymann et al.

(10) Patent No.: US 7,398,525 B2
(45) Date of Patent: Jul. 8, 2008

(54) RESOURCE SCHEDULING IN WORKFLOW MANAGEMENT SYSTEMS

(75) Inventors: Frank Leymann, Aidlingen (DE); Dieter Roller, Schoenaich (DE)

(73) Assignee: International Business Machines Corporation, Armonk, NY (US)

(*) Notice: Subject to any disclaimer, the term of this patent is extended or adjusted under 35 U.S.C. 154(b) by 900 days.

(21) Appl. No.: 10/681,409

(22) Filed: Oct. 8, 2003

(65) Prior Publication Data

US 2004/0078778 A1    Apr. 22, 2004

(30) Foreign Application Priority Data

Oct. 21, 2002    (EP) .................................. 02102469

(51) Int. Cl.
*G06Q 10/00* (2006.01)
*G05B 19/418* (2006.01)
*G06F 9/46* (2006.01)

(52) U.S. Cl. .................................. 718/104; 705/1; 705/8
(58) Field of Classification Search ................. 718/104, 718/100, 101, 102; 705/1, 8
See application file for complete search history.

(56) References Cited

U.S. PATENT DOCUMENTS

| | | | | |
|---|---|---|---|---|
| 5,826,239 A | * | 10/1998 | Du et al. ........................ | 705/8 |
| 6,308,163 B1 | * | 10/2001 | Du et al. ........................ | 705/8 |
| 6,317,774 B1 | * | 11/2001 | Jones et al. .................... | 718/107 |
| 6,507,844 B1 | * | 1/2003 | Leymann et al. ............... | 707/8 |
| 7,027,997 B1 | * | 4/2006 | Robinson et al. .............. | 705/9 |
| 2002/0007389 A1 | * | 1/2002 | Jones et al. .................... | 709/104 |

OTHER PUBLICATIONS

W.M.P.Van Der Aalst, The application of Petri Nets to workflow management, 1998, Journal of Ciruits systems and Computers, vol. 8, No. 1, 53 pages.*
Manhoi Choy and Ambuj K. Singh, Efficient Fault-Tolerant Algorithms for Distributed Resource Allocation, May 1995, ACM, vol. 17, No. 3, pp. 535-559.*

* cited by examiner

*Primary Examiner*—Meng-Al T. An
*Assistant Examiner*—Caroline Arcos (57) ABSTRACT

A system for improved scheduling of resources within a Workflow-Management-System or a computer system with comparable functionality (WFMS). Based on a new resource specification comprised within a process model and associated with an activity, the WFMS determines the resources required for execution of said activity. The invention further schedules a request for allocation of said resources on behalf and in advance of starting execution of said activity. This approach reduces the execution time of the activity as all resources required by the activity will be available when execution of the activity begins; the activity does not have to wait for these resources. Moreover, a WFMS knowing the required resources of the activities it is administrating is able to schedule resource requests to avoid resource conflicts between the activities.

5 Claims, 5 Drawing Sheets

RESOURCE SCHEDULING IN WORKFLOW MANAGEMENT SYSTEMS

FIELD OF THE INVENTION

The present invention relates to means and a method for improving the scheduling of resources within a Workflow-Management-System or a computer system with comparable functionality (WFMS).

BACKGROUND

A new area of technology with increasing importance is the domain of Workflow-Management-Systems (WFMS). WFMS support the modeling and execution of business processes. Business processes executed within a WFMS environment control who will perform which piece of work of a network of pieces of work and which resources are exploited for this work. The individual pieces of work might be distributed across a multitude of different computer systems connected by some type of network.

The product "IBM MQSeries Workflow" (previously called IBM FlowMark) represents such a typical modern, sophisticated, and powerful workflow management system. It supports the modeling of business processes as a network of activities. This network of activities, the process model, is constructed as a directed, acyclic, weighted, colored graph. The nodes of the graph represent the activities, which define the individual tasks that need to be carried out. In general, each of the activities is associated with a piece of code that implements the appropriate task. The edges of the graph, the control connectors, describe the potential sequence of execution of the activities. Definition of the process graph is via IBM MQSeries Workflow's Flow Definition Language (FDL) or via the built-in graphical editor.

The runtime component of the workflow management system interprets the process graph by following the prescribed execution sequence. For each activity, the runtime component invokes the associated piece of code, called activity implementation. When invoked, said piece of code obtains the necessary resources and carries out the designated work. If the requested resource is not available, the piece of code typically waits until it becomes available. The execution time of a process is thus composed of the time needed by the runtime component of the workflow management system for the navigation of the business process (including the invocation of the activity implementations), the execution time of the activity implementations, and the time the activity implementations wait for resources to become available. Thus, the wait time contributes significantly to the execution time of business processes and represents an important problem awaiting solutions for improvements.

It should be noted that the meta model MQSeries Workflow is using to describe business processes is just a particular meta model to do this. Other workflow management systems use other meta models for describing business processes; however they all use the notion of an activity as the smallest element of a business process and the notion of carrying out those activities in some order. Despite the difference in models, the problem of having wait times when carrying out business processes occurs there as well.

Above mentioned execution time problem is even increased if multiple activities controlled by the WFMS are competing for the same or in general conflicting resources resulting in situations where one activity could hinder another activity. In the worst case requests for conflicting resources might result even in deadlock situations.

The invention is based on the objective to improve the handling of resources required by activities within process models controlled by a WFMS. More particularly it is an objective to improve the execution time of business processes.

SUMMARY

The objectives of the invention are solved by the independent claims. Further advantageous arrangements and embodiments of the invention are set forth in the respective subclaims.

The current invention relates to a method and to a system for improved scheduling of resources within a workflow-Management-System or a computer system with comparable functionality (WFMS). It is assumed that the WFMS administrates execution of a process model of a business process and the process model comprising at least one activity. The proposed method comprises a first step of determining whether the process model is comprising a resource specification associated with the activity. The resource specification comprises at least one resource identification of a resource required for execution of said activity.

The proposed method comprises a second step of requesting allocation of said resource on behalf of and in advance of starting execution of the activity. Finally in a third step the method is starting execution of said activity.

The suggested approach improves significantly the processing time (execution time) of a business process. The performance gains are most significant especially if the resources needed by the individual activities are either scarce resources, such as a high-bandwidth line, or offline resources, such as data that has been put onto tape and that requires the mounting of the tape. The current invention allows to handle resources in the most general meaning of this term, comprising all types of entities manageable by a computer system.

DETAILED DESCRIPTION

In the drawings and specification there has been set forth a preferred embodiment of the invention and, although specific terms are used, the description thus given uses terminology in a generic and descriptive sense only and not for purposes of limitation. It will, however, be evident that various modifications and changes may be made thereto without departing from the broader spirit and scope of the invention as set forth in the appended claims.

The present invention can be realized in hardware, software, or a combination of hardware and software. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein. The present invention can also be embedded in a computer program product, which comprises all the features enabling the implementation of the methods described herein, and which—when being loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The current invention is illustrated based on IBM's "MQSeries Workflow" workflow management system. Of course any other WFMS could be used instead. Furthermore the current teaching applies also to any other type of system, which offers WFMS functionalities not as a separate WFMS but within some other type of system.

A resource according to the current invention may refer to any type of entity which can be managed by a computer system. Some simple examples are: CPU cycles, memory, devices, disks and the like.

The following is a short outline on the basic concepts of a workflow management system based on IBM's "MQSeries Workflow" WFMS:

From an enterprise point of view the management of business processes is becoming increasingly important: business processes or process for short control which piece of work will be performed by whom and which resources are exploited for this work, i.e. a business process describes how an enterprise will achieve its business goals. A WFMS may support both, the modeling of business processes and their execution.

Modeling of a business process as a syntactical unit in a way that is directly supported by a software system is extremely desirable. Moreover, the software system can also work as an interpreter basically getting as input such a model: The model, called a process model or workflow model, can then be instantiated and the individual sequence of work steps depending on the context of the instantiation of the model can be determined. Such a model of a business process can be perceived as a template for a class of similar processes performed within an enterprise; it is a schema describing all possible execution variants of a particular kind of business process. An instance of such a model and its interpretation represents an individual process, i.e. a concrete, context dependent execution of a variant prescribed by the model. A WFMS facilitates the management of business processes. It provides a means to describe models of business processes (build time) and it drives business processes based on an associated model (runtime). The meta model of IBM's WFMS MQSeries Workflow, i.e. the syntactical elements provided for describing business process models, and the meaning and interpretation of these syntactical elements, is described next. It should be noted that the meta-model of MQSeries Workflow is just a particular way of representing business processes; other meta-models, such as Petri Nets do exist. It should however also be noted that process graphs are the typical way of representing business processes in all of these approaches.

In MQSeries Workflow business processes are modeled as directed, acyclic, colored, and weighted graphs. The nodes of the graph represent the activities that need to be carried out and the edges of the graph the control connectors that describe the potential sequence in which the activities are to be carried out.

Thus, a process model is a complete representation of a business process, comprising a process diagram and the settings that define the logic behind the components of the diagram. Important components of an MQSeries Workflow process model are:

Processes
Activities
Blocks
Control Flows
Connectors
Data Containers
Data Structures
Conditions
Programs
Staff Not all of these elements will be described below.

Activities are the fundamental elements of the meta model. An activity represents a business action that is from a certain perspective a semantic entity of its own.

It should be noted that the distinction between activity and activity implementation must not necessarily be reflected in the underlying meta model; however from a conceptual point of view each activity is associated with an activity implementation. The activity implementation is typically a piece of code that performs the necessary action associated with the activity. Insofar the activity is the abstract representation of an activity implementation performing that particular business activity.

The flow of control, i.e. the control flow through a running process determines the sequence in which activities are executed. The MQSeries Workflow workflow manager navigates a path through the process that is determined by the evaluation to TRUE of start conditions, exit conditions, and transition conditions.

Figure 1:
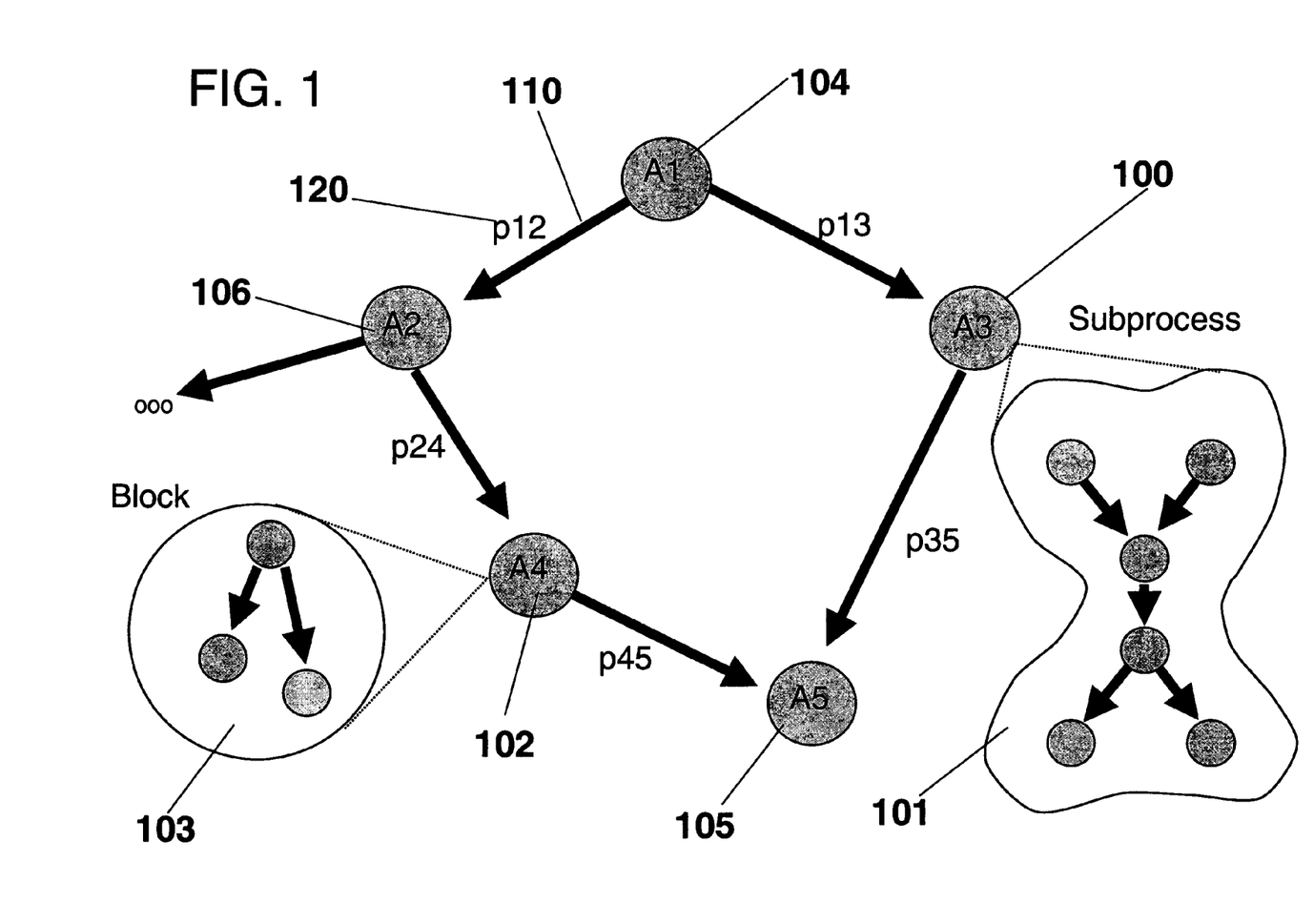
FIG. 1 shows a business process model represented by a process graph according to the state of the art.

As an example of such a process model FIG. 1 shows schematically the structure of such a process graph. Activities (A1 up to A5) are represented as named circles; the name typically describes the purpose of the activity. Activities come in various flavors to address the different tasks that may need to be performed. They may have different activity implementations to meet these diverse needs. Program activities are performed by an assigned program, process-activities like for instance 100 are performed by another process 101, and blocks like for instance 102 implement a macro 103 with a built-in do-until loop. Control connectors P12, . . . , P45 are represented as arrows; the head of the arrow describes the direction in which the flow of control is moving through the process. For instance, the control connector 110 defines that activity A1 104 should be followed by activity A2 106. Transition conditions, such as p12 120, determine whether the control connector is actually been followed in a particular process instance. The activity where the control connector starts is called the source activity; where it ends is called the target activity.

When more than one control connector leaves an activity, this indicates potentially parallel work. Activities that have no incoming control connectors, such as activity A1 104, are called start activities; activities that have no outgoing control connector, such as activity A5 105, are called end activities.

All processes and all activities are associated with context. Context is defined as the data that is passed to the process or activity when invoked. A process or an activity can also return data. The data that is passed to the process or activity is called the input contain r; the data that is returned by a process or activity is called the output container.

The process input container typically provides the overall context of a business process. It determines how a specific business process should be executed by defining which paths should be taken through the business process. For a loan process, for example, the process input container contains the number of the customer who requests a loan. The activity input container provides the appropriate context for the execution of the activity; for example, let's say that the input container provides a customer number. The program that implements the activity to access the customer database and retrieve all information associated with this customer number could use the customer number. The activity would then return the appropriate information in the output container. The output container can then be used by later activities or to further define which paths the business process should be taken.

Figure 2:
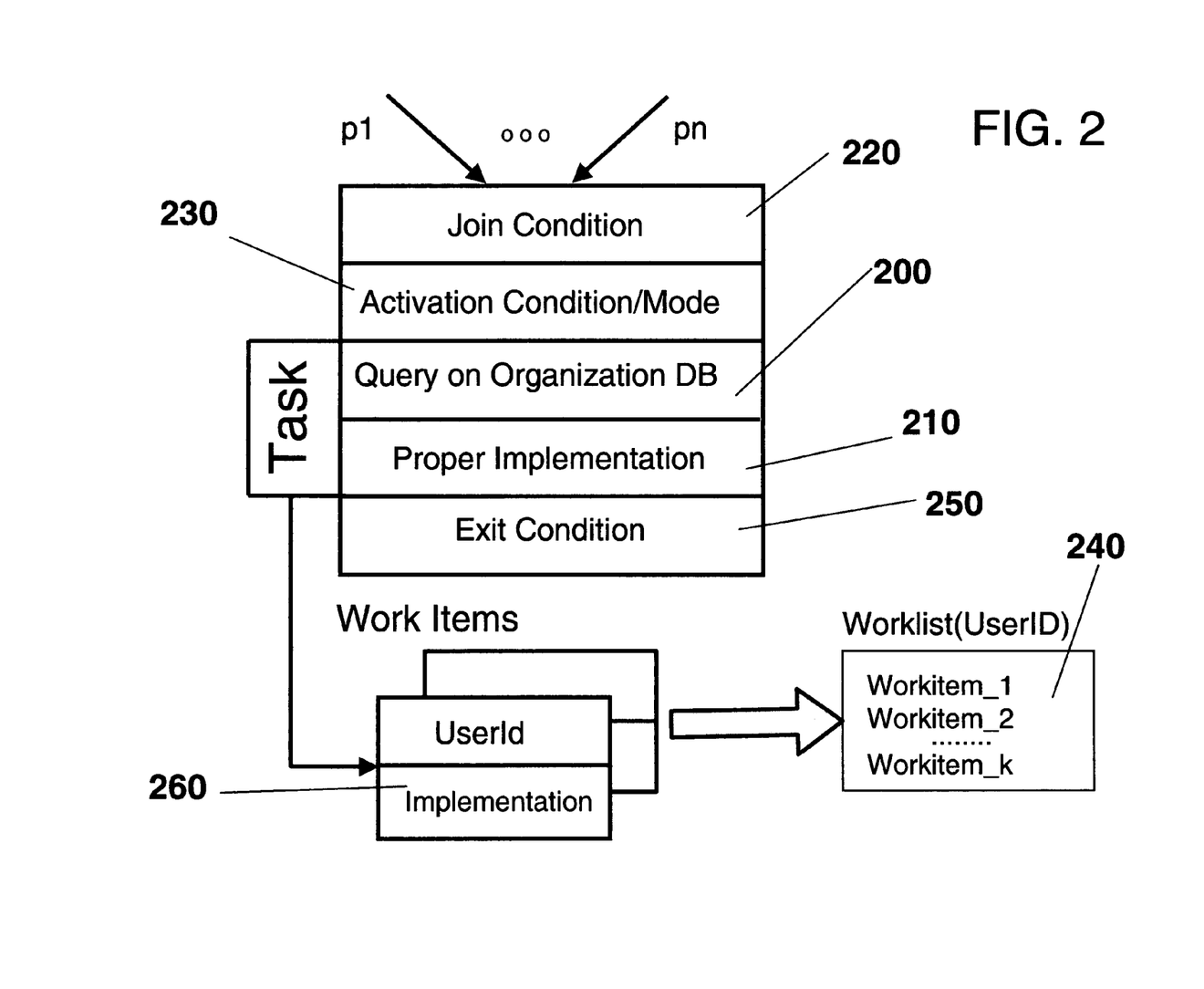
FIG. 2 depicts the fine structure of an activity within a WFMS.

FIG. 2 shows the inner structure of program activities and indicates what is being done in the individual parts of an activity.

As the processing of the incoming control connectors with their associated logical predicates p1, . . . , pn is not of importance for the current invention a detailed description of this feature is skipped.

The query on organization database (200) and proper implementation (210) form the core of the activity.

The query against the organization database specifies in organizational terms which employee should carry out the activity. Since people in the organization are typically called staff, this query against the organizational database is also called a staff query. When the activity is ready for processing, this query is carried out and returns a set of users that are assigned to the activity. The process of finding the appropriate people is called staff resolution.

The proper implementation specifies what is used to carry out the activity and how it is to be carried out. The implementation could be a program that is executed or another process that is invoked.

The combination of the proper implementation and the query against the organization database is called a task. When the activity needs to be carried out, staff resolution returns the list of users that need to be assigned to the activity. Multiple users may be selected for an activity based on the theory that the more people know that a work request requires their action, the more likely it is that the work request is performed soon. The workflow management system ensures that eventually only one user performs the requested work. The workflow management system then builds for each user a work item consisting of the user identification and the proper implementation. A user then uses the work item to launch the appropriate implementation. Facilities provided by the workflow management system allow the user to organize work items with the same characteristics into work lists (240).

Figure 3:
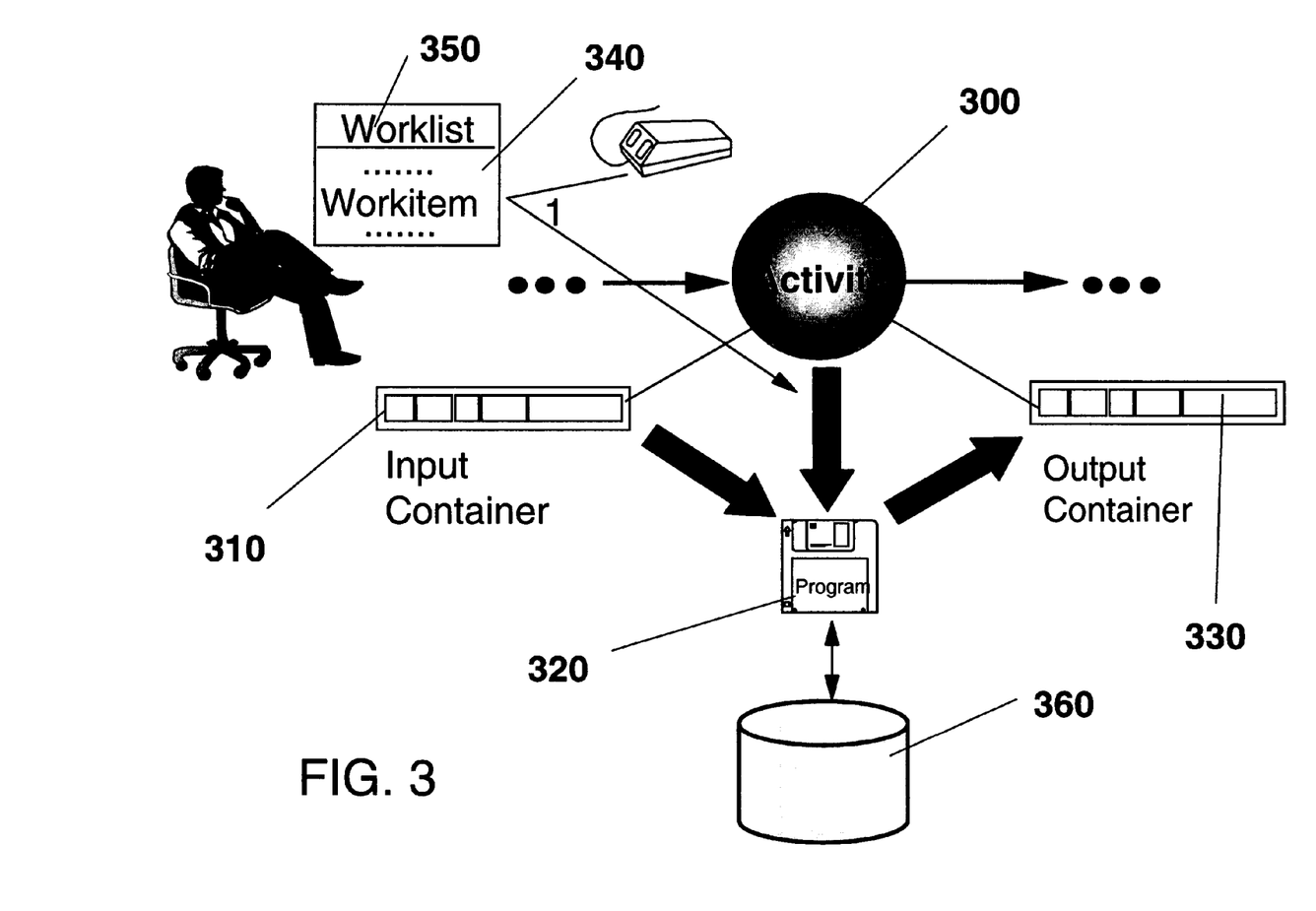
FIG. 3 shows the typical steps that are performed when an activity within a process graph is being carried out by a WFMS.

FIG. 3 illustrates the typical execution of a program activity. It is assumed that the activity is a manual activity that means that a user must start it (in contrast to automatic ones, which can be executed by the system without any user interaction and thus are started by the WFMS automatically).

When the user clicks on a work item (340) on one of his work lists (350), the workflow management system builds the input container (310) for the activity (300). Then, the workflow management system invokes the program (320), i.e. the activity implementation. The program obtains the necessary information from the input container, performs the necessary actions such as interacting with the user or accessing a database (360), puts any new data into the output container (330), and then returns to the workflow management system. The workflow management system evaluates the exit condition (250); if the exit condition evaluates to true, navigation continues. If the exit condition fails, the work item reappears again on the work list so that the user can continue the activity later.

If the activity is an automatic activity, the same actions are performed by the workflow management system. However, the activity implementation is started automatically.

The activity implementations when invoked need resources, such as memory, CPU cycles, files, or many other resources; in general a resource might represent any entity manageable by a computer system. Some of them might be used directly by the activity implementation, such as CPU cycles and memory; others might be used indirectly, such as a table maintained by a relational database management system.

All resources are managed by an execution environment. This execution environment may be anything from a single processor operating system, an application operating system, a fully distributed operation system, or even a combination thereof. Typically the execution environment forms the context wherein which an activity is being executed.

It is the responsibility of this execution environment to provide a platform for the execution of activity implementations and all the applications being invoked as the result of running an activity implementation. It is also the responsibility of the execution environment to provide the computing resources, such as CPU cycles, disks, or memory or other types of resources.

Simple execution environments make resources available to an exploiter when requested by an application; advanced execution environments provide the capability to request the scheduling of resources at any time. When the application then needs the resources, even for example to run itself, the resources will be readily available. This is particularly helpful, if the resources are not available right away and preparation steps are required, such as the mounting of a tape.

When the workflow management system invokes the activity implementation, it does this typically by asking the execution environment to activate the activity implementation. The execution environment allocates appropriate resources on request, such as memory, and then proceeds executing the activity implementation by allocating CPU cycles to the activity implementation.

If a resource is not available, the execution environment, depending on its capabilities, takes a particular action. These actions typically depend on the type of resource and on a set of policies, which can in general be set by system administrators. For example, if more CPU cycles are needed than there are available, a policy of prioritization is applied. Programs with higher priority are assigned more CPU cycles than are assigned to programs with a low priority. Another option for the operating system would be to refuse to run the requested program and return an appropriate indicator to the requestor. Certain types of resources are typically offline, such as tapes. Those resources must first be made online before they can be used; for example, a tape must first be mounted before it can be used.

Waiting for resources should be avoided if execution of a task needs to be performed as quickly as possible. It is particularly important if the overall task consists of a set of smaller tasks, which is the usual case in applications that are not just trivial. If in a business process with 10 individual tasks each task takes 10 minutes, then the execution of the business process takes 100 minutes. If one would need to wait 10 minutes for each activity to have the resources available, then the total execution time of the business process would be 200 minutes; twice as much as would be without waiting for resources.

Above mentioned impact to execution time is even increased if multiple tasks are competing for the same or in general conflicting resources resulting in situations where one task could hinder another task. In the worst case requests for conflicting resources might result even in deadlock situations.

When an activity is being carried out during processing of a business process, the workflow management system invokes for an activity a specified piece of code. Invoking means requesting from the underlying execution environment, such as the operating system or an application server, the execution of the specified piece of code. When invoked, said piece of code obtains the necessary resources and carries out the designated work. If the requested resource is not available, the piece of code typically waits until it becomes available; other options may be to not honor the request at all.

As a first observation of the current invention, the problem of activities being idle and waiting for a resource can be solved under the following two conditions: the business process is being carried out by a workflow management system and the execution environment provides the capability to claim resources in advance (classified earlier as an advanced execution environment).

The present invention proposes a mechanism to improve the processing of activities by having the workflow management system scheduling on behalf of the activities the resources needed by the activities well in advance. Scheduling means requesting from the execution environment the making available of a certain set of resources. As a further observation this scheduling by the workflow management system is enabled and improved based on information provided by the designer of the business process and/or based on information collected by the workflow management system during previous execution of business processes. For that purpose it is suggested to associate within a process model resource specifications with activities and these resource specifications comprise identifications of resources required for execution of the activities.

As a further observation it is noted that based on these resource specifications within a process model it is becoming possible for a workflow management system to analyze the sets of resources required by different activities for conflicting resource requirements. The workflow management system for instance can determine situations where activities are competing for the same resources or where activities might create deadlock situations with respect to their resource requirements. Thus the resource specifications enable a workflow management system to determine overall resource scheduling plans which avoid resource conflicts and thus result in less or no hindering between different activities. The overall result achieved is improved execution times and increased throughput of the system.

It is thus suggested that each activity within a business process is associated with the set of resources that it requires. This association is defined in a new specification, called resource specification, which is made part of the process model. Typical specifications would comprise an identification of the types of required resources as well as the quantities of the resources such as the amount of CPU time needed, the amount of memory needed, the amount of temporary disk storage that needs to be allocated, the files and database the activity accesses and the like. Further suggested data comprised within the resource specifications relates to the identification of the execution environment where to request and allocate a particular resource as well as an assumed waiting time period specifying the time required after an allocation request until said resource actually becomes available. The workflow management uses this information to develop a resource scheduling plan when to allocate which resource for which activity instance. The resource scheduling plan can be determined by the workflow management system such that resource conflicts can be avoided.

Figure 4:
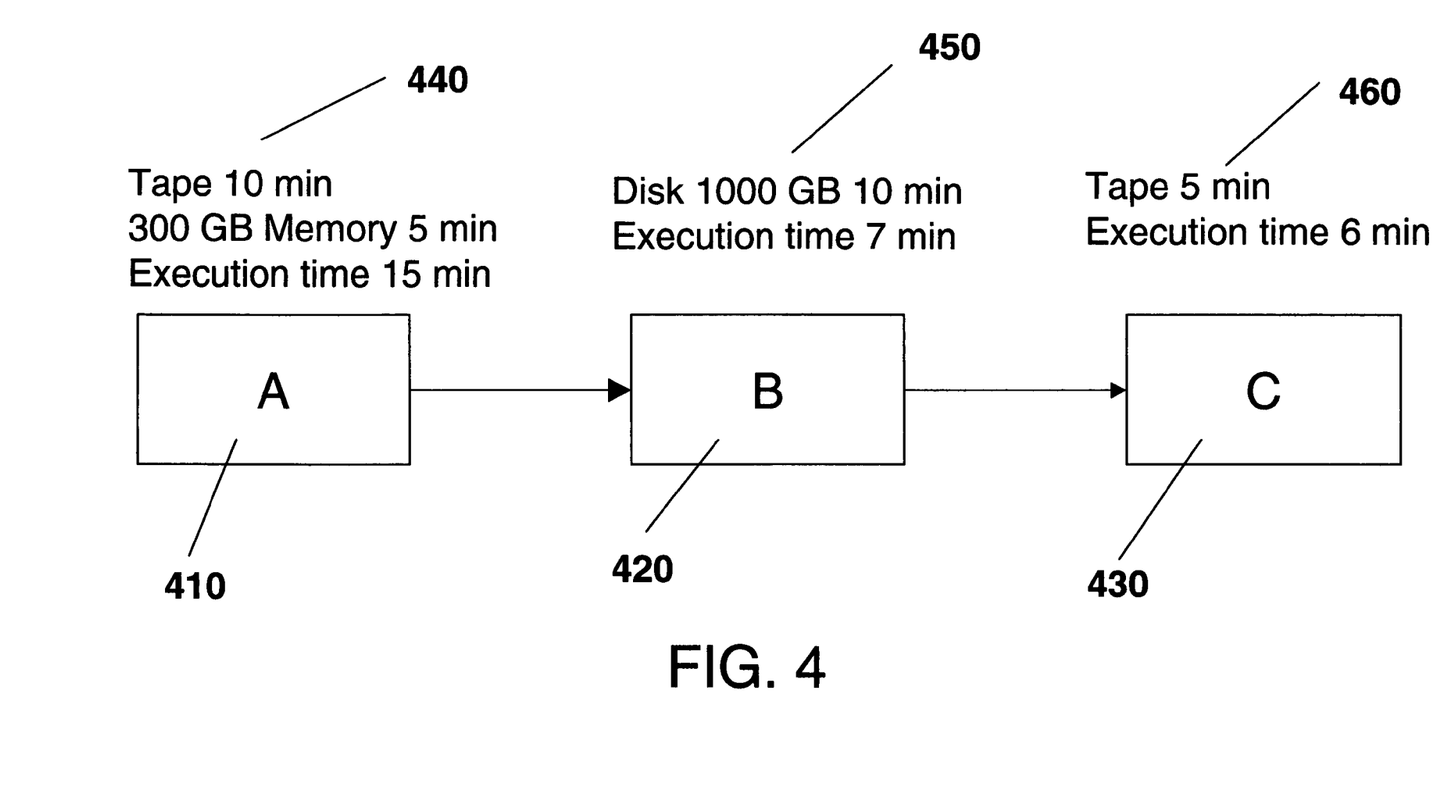
FIG. 4 shows a part of a business process with resources required by each of the activities/activity implementations.

FIG. 4 shows an example of a workflow that contains three activities A (410), B (420), and C (430). Each activity has a set of runtime properties assigned to it, which represent the associated resource specifications (translated into a human readable representation) reflecting the required resources, the amount/quantity of resource required, the assumed waiting time period (specifying the time required after an allocation request until said resource actually is available), the expected execution time for the particular activity and the like. Activity A (410) executes for 15 minutes, requires 300 GB of memory, and needs a tape to be mounted (440). Scheduling of the memory takes 5 minutes; mounting of the tape takes 10 minutes. Similar information (450, 460) is defined for activities B and C.

If the business process in FIG. 4 is executed without any pre-scheduling of resources, the total execution time of the business process is 58 minutes 28(15+7+6) minutes for carrying out the activities, 30 (10+5+10+5) minutes for scheduling the resources.

Figure 5:
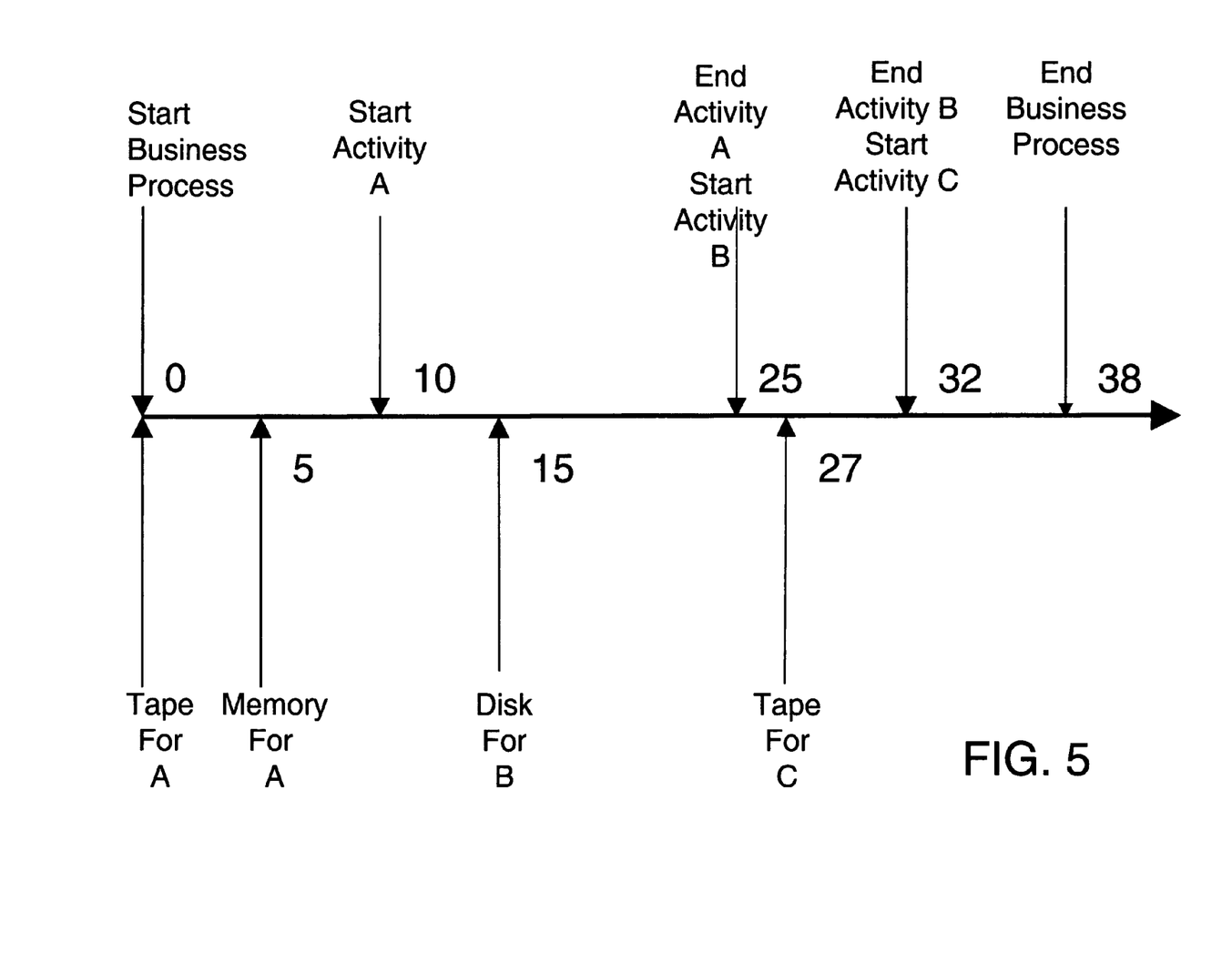
FIG. 5 shows the important actions of the workflow management system when carrying out the part of a business process shown in FIG. 4; specific focus is given to the aspect that it is the WFMS itself requesting allocation of required resources on behalf of and in advance of starting execution of the activities.

As an important observation of the current invention the total execution time can be significantly reduced if the workflow management system schedules (on behalf of the activity) the resources before it is actually used by the invoked activity implementation. FIG. 5 shows how such a resource scheduling plan would look for the business process shown in FIG. 4; FIG. 4 is a graphical representation of this resource scheduling plan, which of course also can be represented in other notations and forms. The workflow management system uses the information associated with each activity (this information is comprised within the resource specification associated with the activity as described above) to determine when the appropriate resource must be requested from the underlying infrastructure (typically the operating system).

It follows from FIG. 5 that ahead of starting activity A under "Start Activity A" the workflow management system allocates the tape resource under "Tape For A" on behalf of that activity.

The numbers within FIG. 5 represent the elapsed time in minutes from the start of the business process under "Start Business Process". As the associated resource specification indicates an assumed waiting time period of 10 minutes (440) required after an allocation request until the tape is actually available the resource scheduling plan defines that the tape resource is requested at least 10 minutes ahead of starting activity A. In a similar manner the resource memory is requested under "Memory For A" at least 5 minutes (this represents the corresponding assumed waiting time period) before starting activity A; to minimize resource conflicts relating to the resource memory, the workflow management system schedules an allocation request not together with that for the resource tape (which in principle would be possible also) because this would exclude other exploiters of that particular resource for additional 5 minutes.

As follows from the resource scheduling plan in FIG. 5 the workflow management system is already engaged in requesting the resource disk under "Disk For B" even though preceding activity A is still executing; this represents also one of the optimization features of the current invention. The resource specification of activity B defines a resource requirement for resource disk with an assumed waiting time period of 10 minutes (450), therefore the workflow management system is requesting this resource at least 10 minutes ahead of starting activity B at "Start Activity B".

According to the example workflow of FIG. 4 the workflow management system would start after successfully executing activity B followed by activity C as a successor activity. As follows from the resource scheduling plan in FIG. 5, the workflow management system is already engaged in requesting the resource tape under "Tape For C" even though preceding activity B is still executing and has not received its end of execution at "End activity B". The resource specification of activity C (460) defines a resource requirement for resource tape with an assumed waiting time period of 5 minutes, therefore the workflow management system is requesting this resource at least 5 minutes ahead of starting activity C at "Start Activity C".

As shown in FIG. 5, the total execution time is 38 minutes representing the significant advantage over the required total execution time of 58 minutes according to the prior art approach.

The quality and precision of the suggested technology depends on the quality and procession of the data comprised within the resource specifications (like the assumed waiting time periods) associated with the activities. The more accurate this data is, the more accurately can the workflow management system schedules the resources. The accuracy of the numbers can be improved through a set of optional actions that the workflow management system performs as an ongoing process when carrying out business processes:

By monitoring and collecting the actual time it takes from scheduling a required resource until that resource is actually available, i.e. determining the actual waiting time period until the requested resource becomes available. Various strategies could be exploited then how this actual waiting time period determined by monitoring could be used by the workflow management system. One possibility would be to use the actual waiting time period as a more current and new assumed waiting time period within the above outlined resource scheduling process. Another possibility would be to take a multitude of such monitored actual waiting time periods and apply some statistical measure on it for determining a new assumed waiting time period. For instance one could use the mean value of such a set of monitored actual waiting time periods as a current assumed waiting time period. Of course other statistical measures are possible also.

By monitoring and collecting the actual time it takes to carry out an activity, i.e. determining the actual execution time of an activity.

In all of these cases the current invention further suggests that the workflow management system use this monitored data to update the corresponding resource specifications within the process model automatically.

Depending on the structure of the business process and the costs associated with unnecessary scheduling of resources and the amount of money paid for the business process, further optimizations could be performed.

Further optimization could also be performed by having the workflow management system scheduling its own resources the same way as scheduling the resources for the activity implementations.

We claim:

1. A computerized method for resource handling within a Workflow Management System (WFMS), said WFMS administrating execution of a process-model of a business-process wherein said process-model comprising at least a first activity and a second activity, said method comprising the steps of:
    determining said process-model of the business-process comprises a first resource-specification associated with said second activity, said first resource-specification comprising:
        at least one first resource-identification of a first resource required for execution of said second activity, and
        an assumed first waiting time period for said second-activity specifying a time required after a first allocation request until said first resource is actually available for said second activity,
    requesting allocation of said first resource on behalf of and at least said assumed first waiting time period in advance of starting execution of said second activity,
    monitoring within said requesting allocation step an actual waiting time period required after said allocation request until said first resource is available,
    updating said assumed waiting time period to a new assumed waiting time period in said process-model of the business-process based on said actual waiting time period; and
    starting execution of said first activity followed by said second activity.

2. The computerized method for resource handling according to claim 1, wherein in said starting step said second activity is not started before said first resource has been allocated successfully.

3. The computerized method for resource handling according to claim 1, wherein said first resource-specification comprises an identification of an execution-environment responsible for administering said first resource, and
    said allocation request of said first resource is requested from said execution-environment.

4. The computerized method for resource handling according to claim 1, wherein said updating is using one of the following strategies;
    using said actual waiting time period as new assumed waiting time period, or
    determining a new assumed waiting time period based on a statistical measure employing said actual waiting time period.

5. The computerized method for resource handling according to claim 1, further comprising
    determining said process-model of the business method comprises a second resource specification associated with a third activity, said second resource-specification comprising:
        the first resource-identification of the first resource required for execution of said third activity, and
        a second assumed waiting time period specifying a second time required after a second allocation request until said first resource is actually available for said third activity; and
    scheduling said first resource for use by said second activity and said third activity based upon said first and second assumed waiting times.

* * * * *